235-380 SR
10/7/80 XR 4,226,360

United States Patent [19] [11] 4,226,360
Simjian [45] Oct. 7, 1980

[54] METERING SYSTEM

[76] Inventor: Luther G. Simjian, Lago Mar Pl., 1750 S. Ocean La., Fort Lauderdale, Fla. 33316

[21] Appl. No.: 970,995

[22] Filed: Dec. 19, 1978

[51] Int. Cl.[3] .................... G06F 15/20; H04M 11/00; H04Q 3/72; G06K 5/00

[52] U.S. Cl. ................................ 235/375; 340/147 R; 179/2 CA; 235/380

[58] Field of Search .................... 364/479; 340/149 R, 340/149 A, 147 R; 235/130 R, 480, 449, 375, 380, 381, 382; 250/569, 568; 360/2; 179/2 CA

[56] References Cited

U.S. PATENT DOCUMENTS

| | | | |
|---|---|---|---|
| 3,034,329 | 5/1962 | Pitney | 235/130 |
| 3,255,439 | 6/1966 | Simjian | 340/147 R |
| 3,394,246 | 7/1968 | Goldman | 340/149 A |
| 3,428,948 | 2/1969 | Simjian | 340/147 R |
| 3,501,744 | 3/1970 | Simjian | 179/2 CA |
| 3,588,449 | 6/1971 | Paterson | 340/149 A |
| 3,611,293 | 10/1971 | Constable | 340/149 A |
| 3,792,446 | 2/1974 | McFiggins | 364/900 |
| 4,020,325 | 4/1977 | Pfost | 235/480 |
| 4,123,747 | 10/1978 | Lancto | 340/149 A |

*Primary Examiner*—Robert M. Kilgore

[57] ABSTRACT

A metering device, such as a postage meter, can be updated by a code bearing means which is provided with a first discernible code and a second obscured code, for instance, magnetic code. A computer stores a third code in association with the first code, however, the third code is correlated with the second code. Upon inserting the code bearing means in the metering device and obtaining the third code from the computer, the metering device is conditioned for updating responsive to said second code from the code bearing means and the third code from the computer being in predetermined correlation.

10 Claims, 4 Drawing Figures

FIG. 1
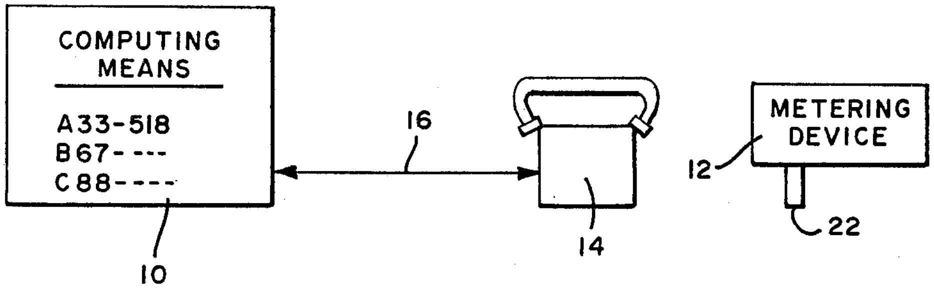
FIG. 2
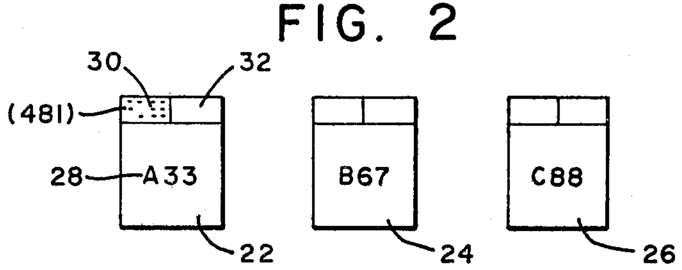
FIG. 3
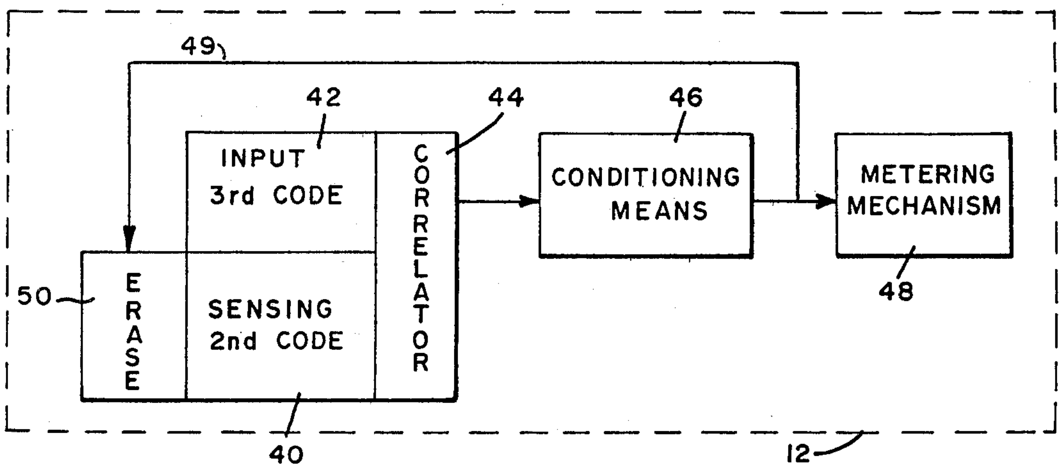
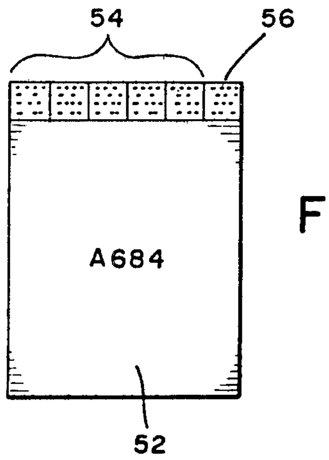
FIG. 4

METERING SYSTEM

REFERENCE TO RELATED APPLICATION

This patent application is related to my copending application for U.S. Pat. Ser. No. 952,637 filed Oct. 19, 1978.

BACKGROUND OF THE INVENTION

This invention concerns metering systems in which a meter upon being updated is conditioned for dispensing a predetermined sum or quantity of articles or is conditioned for dispensing postage stamps or imprinting validation stamps up to a predetermined sum of money. A typical specific example of such metering systems is the well known postage meter which from time to time needs to be recharged with a sum of money in order to dispense validation of variable amounts of money. When the supply of money or credit available is exhausted, the meter is blocked from further operation. The meter can be charged with a new sum of money prior to reaching its fully exhausted condition and, thus, remains operable while a sum of money, or credit, is available. Meters of the type described above are well known and some of the arrangements for meters include means for charging the meter without physically bringing the meter to the Post Office. The latter arrangements are shown, for example, in my U.S. Pat. No. 3,255,439 "Postage Metering System" dated June 7, 1966; U.S. Pat. No. 3,428,948 "Postage Metering System" dated Feb. 18, 1969; U.S. Pat. No. 3,501,744 "Postage Metering System Having Signal Conditioning Means" dated Mar. 17, 1970, and in the patent to McFiggins et al U.S. Pat. No. 3,792,446 "Remote Postage Meter Resetting Method" dated Feb. 12, 1974. Other pertinent art referring to the meter itself using combination locks or requiring predetermined numbers for recharging the meter will be found in U.S. Pat. No. 3,034,329 "Combination Lock Device" dated May 15, 1962 and U.S. Pat. No. 3,664,231 "Locking Device" dated May 23, 1972.

With respect to U.S. Pat. No. 3,664,231 and U.S. Pat. No. 3,792,446, the meter includes a storage tape having numbers to be used in predetermined sequence, the tape being stored in the meter and the user of the meter who is a subscriber to the service, is informed of a currently applicable number which correlates with the respective number on the tape. Responsive to the existence of correlation between the number set on the lock and the current number on the storage tape, the meter can be updated or recharged and the next successive number on the tape becomes applicable to the following recharging operation. The user is advised of the next number to be used for charging the meter.

The present invention omits the need for a storage tape in the meter and employs instead uniquely coded code bearing means in combination with a computer for updating the meter.

Other significant differences and advantages of the present invention over the prior art will be more clearly apparent from the description hereinafter.

SUMMARY OF THE INVENTION

In accordance with the present invention there is provided a code bearing means having a first code and a second code, and the metering device, such as a postage meter, is adapted to receive the code bearing means. A remote computing means includes a storage means for storing said first code and correlating such first code with a third code. Input means are adapted to provide said first code to said computing means whereupon said computing means provides said third code. Means associated with said metering device are adapted to sense said second code from said code bearing means and are adapted, further, to receive said third code and, responsive to said codes being in predetermined correlation, condition said metering device for updating. Additional means render the same combination of codes unusable responsive to conditioning of said metering device having occurred.

BRIEF DESCRIPTION OF THE DRAWINGS

FIG. 1 is a schematic block diagram of the metering system forming the invention;

FIG. 2 is a schematic illustration of several code bearing means;

FIG. 3 is a schematic block diagram of portions forming the metering device, and FIG. 4 is an alternative embodiment of the code bearing means shown in FIG. 2.

DETAILED DESCRIPTION OF THE INVENTION

Referring now to the figures and FIG. 1 in particular, numeral 10 identifies a computing means which is located remote from a metering device 12, such as a postage meter or similar device. Also remote from the computing means 10 there is a transmitting means 14 which is connected to the computing means 10 by a suitable electrical transmitting line 16, for instance, a cable or a wireless connection. Most suitably, the transmitting means is a telephone with signal input means such as audio signals or electrical push buttons (push button telephone) which in response to an output from the computing means 10 provides the data provided by the computing means 10 in audio or visual form as is well known, for instance, in connection with stock market quotations, see U.S. Pat. No. 3,082,402 to J. R. Scantlin. The telephone 14 may be in proximity to the metering device 12, but it may also be remote from the metering device.

The metering device 12 is recharged or updated by the use of a code bearing means of the type illustrated in FIG. 2. In FIG. 2 three illustrative code bearing means 22, 24 and 26 are shown. Each code bearing means, typically a plastic card similar to a credit card, is provided with a first code 28 which is discernible to a person and for this reason such code may comprise printed characters "A33" as evident on the code bearing member. On members 24 and 26 the first code typically is "B67" and "C88" respectively.

Each code bearing member includes a second code which is obscured and therefore not readily discernible to the user of the system. To this end the second code may comprise magnetic characters disposed in a field 30. For the present example it is assumed that the second code of the code bearing member 22 comprises a three digit number "481". The corresponding second codes on the members 24 and 26 are distinct for each such member. Optionally, each member 22, 24 and 26 may include also a further code in field 32 which associates such code bearing member with a particular metering device 12 and, therefore, such further code may be considered a validation code which validates the use of a particular code bearing member with a respective predetermined metering device.

The computing means 10 has stored therein the first codes of the code bearing members which have been issued to a subscriber using the metering device 12. Thus, the computing means has stored therein the data "A33", "B67" and "C88" indicated on the code bearing members 22, 24 and 26. Associated with each first code data, the computing means also stores a plurality of third codes, each such third code data being correlated with the second code on the respective code bearing means. To clearly illustrate this correlation, it was assumed that member 22 has a first code "A33" and a second non-discernible code "481". The computing means 10 stores associated with "A33" a third code "518", the latter code being the nine complement numerals. Other correlations, of course, can be selected at the option of the designer of the system and the specific type of correlation is not pertinent to the invention.

Operation of the foregoing arrangement will be more clearly evident from the following description. In order to update the metering device 12, the subscriber takes a code bearing member, such as member 22, and brings it into engagement with the metering device 12, see FIG. 1, for instance a slot in the metering device. As seen in FIG. 3, the metering device includes sensing means 40 for reading the magnetic code in field 30, i.e. the second code which is not discernible to the subscriber. The subscriber communicates the first code "A33" via the transmitting means 14 and 16 to the computer 10 whereupon the computer by the use of internal search means searches for "A33" and provides as output a signal corresponding to numerals "518" which is communicated via the transmitting means to the subscriber, he receiving this data as visual output or spoken words at the telephone 14. The metering device includes manual input means 42, pushbuttons for instance, so that the subscriber now inputs the third code "518" provided by the computer 10. A correlator 44 associated with the metering device 12 establishes the existence of predetermined correlation between the second and third codes and responsive to the condition of correlation actuates conditioning means 46 which permit the metering mechanism 48 to be charged or updated. The conditioning means 46 may comprise means for the temporary coupling shafts within the meter charging mechanism, see U.S. Pat. No. 3,501,744. Responsive to the actuation of the conditioning mechanism 46 a signal is fed via conductor 49 to an erase means 50 which erases the code from the field 30 of the code bearing member 22 to render the code bearing member invalid for further use. Alternatively, other cancellation or voiding means may be used such as heat or cutting means.

Assuming that the predetermined condition of correlation is not attained the conditioning means 46 remains non-actuated and the metering mechanism 48 cannot be updated.

Alternatively, instead of erasing or voiding the second code on the code bearing member, erasing means associated with the computing means may be provided to erase, responsive to providing the third code, either the first code, the third code or both codes from the storage medium provided in the computing means, the principal object being to foil for the immediate future correlation between the first, second and third code data used in a preceding updating operation.

FIG. 4 illustrates schematically an alternative embodiment of the code bearing member. The member 52 includes a first code "A684", a plurality of second code fields 54 and a field 56 for the validation code. This particular member 52 is usable for a plurality of updating operations as governed by the quantity of fields provided. In this embodiment only a single field is erased responsive to each updating operation or, alternatively, only a particular third code in the computing means is erased since the first code must be preserved for additional updating operations.

In the foregoing system, the subscriber is issued the described code bearing means by the Post Office or a private concern upon the payment of a required sum of money. Simultaneously with the issuance of the code bearing means, the computing means 10 is programmed by the code bearing means issuing party as described heretofore. Alternatively, the subscriber is invoiced in response to updating operations as recorded by the computing means and evident by the issuance of third code data. In both cases, the heretofore disclosed arrangement obviates the need for bringing a postage meter mechanism to the Post Office for being recharged thereat.

It will be apparent, moreover, that the second code and third code data need not to be different but may be identical, and correlation is achieved by matching the respective code data at the correlator 44.

The above description deals specifically with a postage metering device. It should be understood that the described arrangement is not limited to dispensing postage, but that the metering device will be found usable also for purposes other than that specifically illustrated and described.

While I have described and illustrated certain preferred embodiments of my invention, it will be apparent to those skilled in the art that various further changes and modifications may be made without departing from the broad principle of my invention which shall be limited only by the scope of the appended claims.

What is claimed is:

1. The method of updating a metering device of the postage meter type or similar type comprising:
   - providing a code bearing means having a first and a second code;
   - placing said code bearing means into cooperative relation with the metering device for causing said second code to be entered into the metering device;
   - transmitting the first code from said code bearing means to a computing means and said computing means being programmed for providing in response to the receipt of said first code a third code which has a predetermined correlation with said second code, and
   - entering said third code into said metering device for causing said metering device to be conditioned for updating responsive to said second code and said third code being in predetermined correlation.

2. The method as set forth in claim 1, said first code being a visible code.

3. The method as set forth in claim 1, said second code being obscured.

4. The method as set forth in claim 1, said first code being transmitted and said computing means providing said third code by signal transmitting means.

5. The method as set forth in claim 1, and causing the code bearing means to be rendered entirely or partially unusable for reuse responsive to said metering device having been updated.

6. The method of updating a metering device of the postage meter type or similar type comprising:

providing a code bearing means having a first code and a second code;

placing said code bearing means into cooperative relation with the metering device and causing said second code to be entered into the metering device;

transmitting the first code from said code bearing means via signal transmitting means to a remote computing means and said computing means being programmed to provide responsive to the receipt of said first code via said signal transmitting means a third code which is correlated with said second code;

entering said third code into said metering device for causing said metering device to be conditioned for updating responsive to said second code and said third code being in predetermined correlation, and updating said metering device responsive to the existence of said predetermined correlation.

7. The method as set forth in claim 6, and causing said code bearing means to be rendered entirely or partially unusable for reuse responsive to said metering device having been updated.

8. The method as set forth in claim 6, said signal transmitting means including telephone communication means.

9. The method as set forth in claim 6, said third code being entered manually.

10. The method as set forth in claim 6, said second code comprising a plurality of magnetic characters.

* * * * *